(12) United States Patent
Martin et al.

(10) Patent No.: US 7,967,720 B2
(45) Date of Patent: Jun. 28, 2011

(54) DYNAMIC ALLOCATION OF DRIVE TORQUE

(75) Inventors: Douglas Raymond Martin, Canton, MI (US); Edward Badillo, Flat Rock, MI (US); Paul M. Gartner, Oshtemo, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 898 days.

(21) Appl. No.: 11/762,272

(22) Filed: Jun. 13, 2007

(65) Prior Publication Data

US 2008/0308066 A1 Dec. 18, 2008

(51) Int. Cl.
 *B60K 1/02* (2006.01)
(52) U.S. Cl. ............................................ 477/3; 123/520
(58) Field of Classification Search ......................... None
 See application file for complete search history.

(56) References Cited

U.S. PATENT DOCUMENTS

| | | | |
|---|---|---|---|
| 6,209,313 B1 | 4/2001 | Wissler et al. | |
| 6,209,317 B1 | 4/2001 | Hirota | |
| 6,393,345 B1 | 5/2002 | Kerns et al. | |
| 6,557,534 B2 | 5/2003 | Robichaux et al. | |
| 6,664,651 B1 | 12/2003 | Kotre et al. | |
| 6,823,660 B2 | 11/2004 | Minami | |
| 6,833,272 B1 | 12/2004 | Binder et al. | |
| 6,871,490 B2 | 3/2005 | Liang et al. | |
| 6,892,530 B2 | 5/2005 | Montreuil et al. | |
| 6,928,506 B2 | 8/2005 | Czech et al. | |
| 7,093,427 B2 | 8/2006 | Van Nieuwstadt et al. | |
| 2004/0176211 A1* | 9/2004 | Kitajima et al. | 477/3 |
| 2005/0066949 A1 | 3/2005 | Suzuki | |
| 2007/0044456 A1 | 3/2007 | Upadhyay et al. | |
| 2007/0142166 A1* | 6/2007 | Gebby | 477/15 |

FOREIGN PATENT DOCUMENTS

GB 2435625 9/2007

OTHER PUBLICATIONS

UK Intellectual Property Office, International Search Report of GB0807465.0, Aug. 5, 2008, UK IPO, 1 page.

* cited by examiner

*Primary Examiner* — David D. Le
*Assistant Examiner* — Justin Holmes
(74) *Attorney, Agent, or Firm* — Allan J. Lippa; Alleman Hall McCoy Russell & Tuttle LLP

(57) ABSTRACT

A method for operating a powertrain in a hybrid vehicle is provided. The method comprises providing torque to drive the vehicle from both an electric drive and an engine, where engine torque is varied within an allowable range. When operating the engine at an edge of the range, the range may be adjusted based on conditions. In this way, it is possible to compensate for an engine that has a variable maximum torque output depending on operating conditions.

11 Claims, 8 Drawing Sheets

DYNAMIC ALLOCATION OF DRIVE TORQUE

BACKGROUND AND SUMMARY

In some vehicles, such as hybrid vehicles, a high level system controller may control a plurality of power and/or torque sources for propelling the vehicle. For example, the controller may allocate a total drive request among the various sources in different ways depending on operating conditions.

In one example, one factor considered by the controller in allocating the request among the various sources is the available output range of an individual source. For example, an engine may have a variable maximum torque output depending on operating conditions, and it may further change as the engine ages. Thus, if the range varies differently from the predicted range, the allocation made by the controller may result in the engine operating at less than its peak output, or providing less output than the controller requests. Such operation can affect vehicle performance and fuel economy. Further still, if the engine is over-taxed, it may provide insufficient vacuum for various conditions, such as fuel vapor purging.

The inventors herein have recognized that a range of the available maximum engine torque can be accurately estimated based on engine operating conditions. In one embodiment, a method for operating a powertrain in a vehicle is provided. The powertrain includes an electric drive and an internal combustion engine. The method comprises providing torque to drive the vehicle from both the electric drive and the engine, where engine torque is varied within an allowable range; and when operating the engine at an edge of the range, adjusting the range based on whether a selected operating condition can be provided by the engine. In this way, it is possible to more accurately allocate the propulsion torque among the hybrid vehicles various sources, and thereby achieve improved vehicle operation. In one particular example, it is possible to adaptively adjust the available engine output torque range to the vehicle operating conditions and account for production variation, engine aging, etc.

DETAILED DESCRIPTION OF THE DEPICTED EMBODIMENTS

Figure 1:
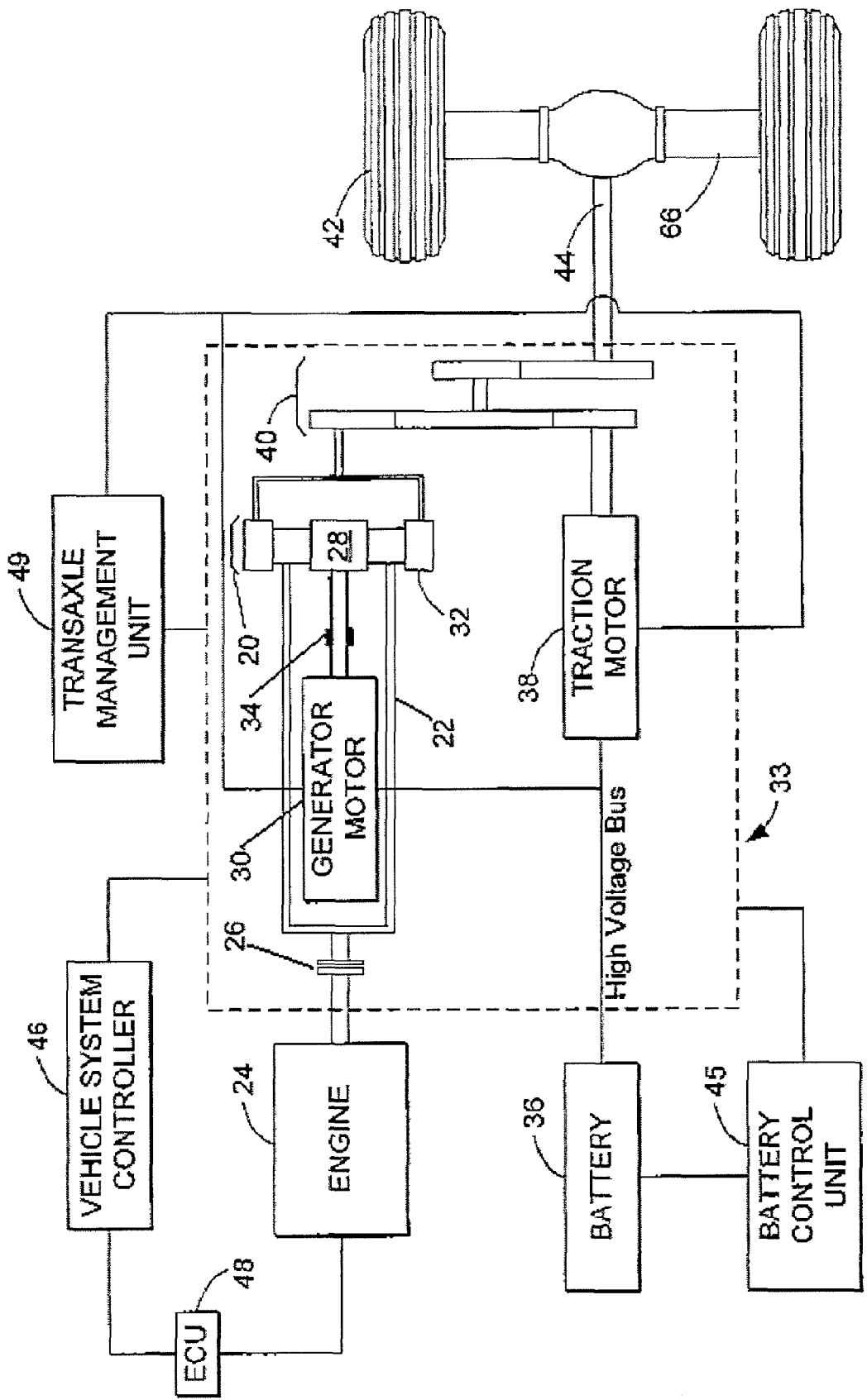
FIG. 1 is a schematic diagram of an engine in an example hybrid powertrain of a hybrid electric vehicle.

The present disclosure may be directed to vehicles that include two or more different power sources, such as hybrid electric vehicles (HEVs). FIG. 1 demonstrates one possible configuration, specifically a parallel/series hybrid electric vehicle (split) configuration. However, various other hybrid configurations may be used, such as series, parallel, integrated starter/alternator, etc.

In an HEV, a planetary gear set 20 mechanically couples a carrier gear 22 to an engine 24 via a one way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine speed can be controlled by varying the split to the series path while maintaining the mechanical connection through the parallel path. The traction motor 38 augments the engine power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface (see further details in FIG. 2). In one example, the ECU 48 and VSC 46 can be placed in the same unit, but are actually separate controllers. Alternatively, they may be the same controller, or placed in separate units. The VSC 46 communicates with the ECU 48, as well as a battery control unit (BCU) 45 and a transaxle management unit (TMU) 49 through a communication network such as a controller area network (CAN) 33. The BCU 45 connects to the battery 36 via a hardware interface. The TMU 49 controls the generator motor 30 and the traction motor 38 via a hardwire interface. The control units, VSC 46, ECU 48, BCU 45, and TMU 49, and controller area network 33 can include one or more microprocessors, computers, or central processing units; one or more computer readable storage devices; one or more memory management units; and one or more input/output devices for communicating with various sensors, actuators and control circuits.

It should be appreciated that FIG. 1 only demonstrates one configuration of an HEV. However, various vehicle types having an auxiliary power source may be used. For example, the present disclosure may be useful in a fuel cell HEV, a gasoline HEV, an ethanol HEV, a flexfuel HEV, a hydrogen engine HEV, etc.

Figure 2:
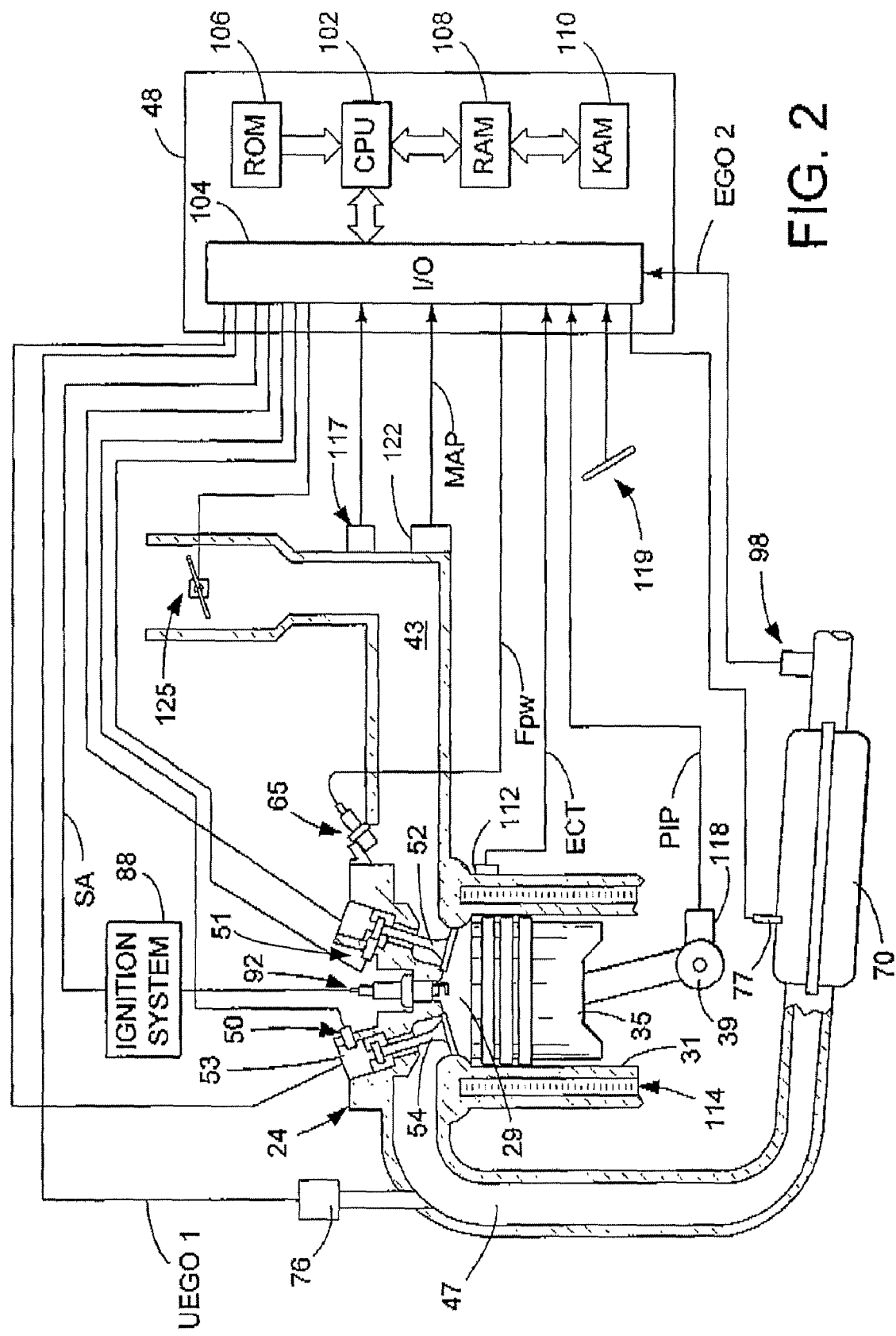
FIG. 2 is a schematic diagram of an engine, intake system, and exhaust system of the vehicle of FIG. 1.

FIG. 2 shows an example engine 24 and exhaust system that may be used with the HEV system illustrated in FIG. 1.

Internal combustion engine 24, comprising a plurality of cylinders, one cylinder 30 of which is shown in FIG. 2, is controlled by ECU 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. Each intake and exhaust valve is operated by an electro-mechanically controlled valve coil and armature assembly 53. Armature temperature is determined by temperature sensor 51. Valve position is determined by position sensor 50. In an alternative example, each of valve actuators for valves 52 and 54 has a position sensor and a temperature sensor. In another alternative embodiment, cam actuated valves may be used with or without variable cam timing or variable valve lift.

Intake manifold 43 is also shown having fuel injector 65 coupled thereto for delivering liquid fuel in proportion to the pulse width of signal FPW from controller 48. Fuel is delivered to fuel injector 65 by fuel system (shown in FIG. 3) including a fuel tank, a fuel pump, and a fuel rail (shown in FIG. 3). Alternatively, the engine may be configured such that the fuel is injected directly into the engine cylinder, which is known to those skilled in the art as direct injection. In addition, intake manifold 43 is shown communicating with optional electronic throttle 125.

Distributorless ignition system 88 provides ignition spark to combustion chamber 29 via spark plug 92 in response to ECU 48. Universal Exhaust Gas Oxygen (UEGO) sensor 76 is shown coupled to exhaust manifold 47 upstream of catalytic converter 70. Alternatively, a two-state exhaust gas oxygen sensor may be substituted for UEGO sensor 76. Two-state exhaust gas oxygen sensor 98 is shown coupled to exhaust manifold 47 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof. Converter 70 can include multiple catalyst bricks, in one example. In another example, multiple emission control devices, each with multiple bricks, can be used. Converter 70 can be a three-way type catalyst in one example.

ECU 48 is shown in FIG. 2 as a conventional microcomputer including: microprocessor unit (CPU) 102, input/output ports 104, read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 43; a measurement (ACT) of engine air amount temperature or manifold temperature from temperature sensor 117; and an engine position sensor 118, for example a Hall effect sensor, sensing crankshaft 39 position. In one aspect of the present description, engine position sensor 118 produces a predetermined number of equally spaced pulses every revolution of the crankshaft from which engine speed (RPM) may be determined.

In an alternative embodiment, a direct injection type engine may be used where fuel injector 65 is positioned in combustion chamber 29, either in the cylinder head similar to spark plug 92, or on the side of the combustion chamber.

Figure 3:
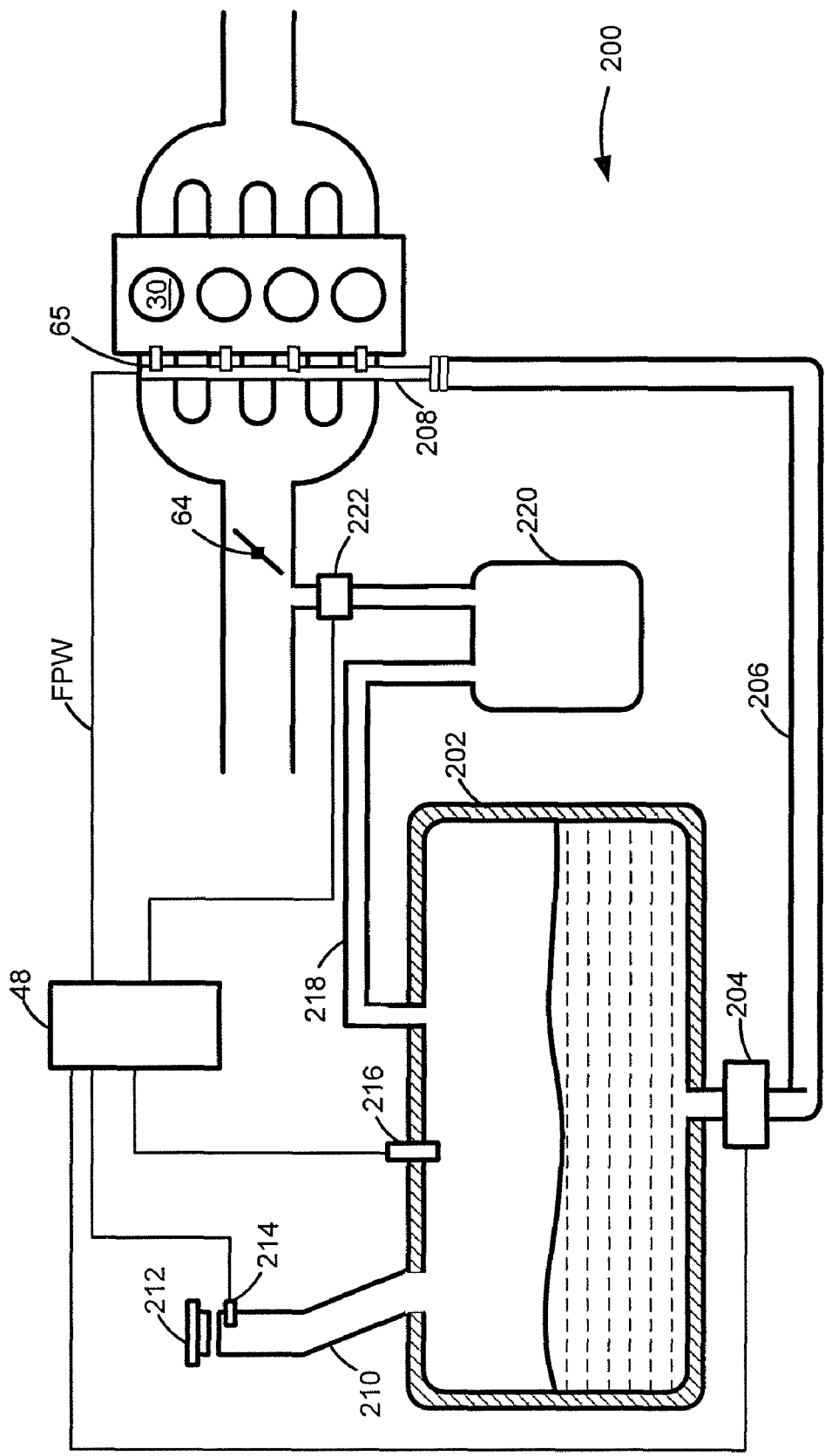
FIG. 3 is a schematic diagram of an exemplary embodiment of a fuel system of the vehicle of FIG. 1

Referring now to FIG. 3, an exemplary embodiment of a fuel system is illustrated. Fuel system 200 includes fuel storage tank 202. Fuel may be pumped from fuel storage tank 202 through fuel delivery pipe 206 to fuel rail 208 via fuel pump 204. Fuel rail 208 may disperse fuel to fuel injectors 65 according to signal FPW from controller 48 to be injected into the ports of cylinder(s) of engine 24. Fuel tank 202 includes filling tube 210 for receiving fuel. Fuel filling tube 210 may be configured to extend away from fuel tank 202 to the external edge of the body of the vehicle so that it is accessible by a vehicle operator to fill the fuel tank. Fuel filling tube 210 may be fitted with a fuel cap 212 which may be removed during fuel tank filling. Fuel cap 212 may be configured to create a vapor-tight seal when connected to fuel filling tube 210 such that fuel vapor may be prevented from escaping from the fuel filling tube and the fuel tank. Fuel cap sensor 214 may be positioned in a sidewall of fuel filling tube 210. Fuel cap sensor 214 may send signals to ECU 48 indicating that fuel cap 210 has been removed or that the fuel cap is in an orientation that seals fuel tube 210.

The liquid fuel level in fuel tank 202 may be determined by ECU 48 using sensor measurements. For example, in some embodiments, a liquid fuel level measuring device (not shown) that floats on the surface of the liquid fuel in the tank may determine the volume of liquid fuel in the tank. Further, in some embodiments, sensor 216 may measure fuel tank pressure and a liquid fuel level may be derived from that pressure measurement. An indication of the liquid fuel level may be provided to the driver based on the determination via measurement and/or calculation. ECU 48 may generate a fuel level reading that may range between a full fuel tank and an empty fuel tank based on the received measurements and/or the determination. The indication may be displayed to the vehicle operator via a fuel level indicator that may be used by the vehicle operator for fuel tank filling purposes.

Fuel system 200 further includes fuel vapor canister 220 that connects to fuel tank 202 via vent pipe 218. In order to regulate pressure in fuel tank 202, fuel vapor may flow from fuel tank 202 through vent pipe 218 to fuel vapor canister 220. Fuel vapor canister 220 may trap fuel vapor flowing into the canister while allowing air filtered through the canister to be vented to the atmosphere via an air vent (not shown). In some embodiments, the fuel vapor canister may filter fuel vapor with charcoal. The fuel vapor may adhere to the charcoal until the fuel vapor is purged.

Fuel vapor canister saturation may occur in response to various operating conditions and events. In one example, fuel tank filling may force fuel vapor residing in the fuel tank into the canister causing canister saturation. As another example, heat and/or pressure generated during vehicle operation may cause liquid fuel to evaporate creating fuel vapor which may be transferred into the canister causing saturation.

In order to reduce over saturation of the fuel vapor canister and release of fuel vapor to the atmosphere, fuel vapor may be purged from fuel vapor canister 220 through control of purge valve 222. Fuel vapor may be purged from the fuel vapor canister using engine vacuum created during engine operation. In one example, engine vacuum may be created by actuating throttle valve 125 and upon activation of purge valve 222, fuel vapor may travel from fuel vapor canister 220 into the intake manifold 43 and may enter the cylinder(s) 30 for combustion. By introducing fuel vapor into cylinder(s) 30 and not into the atmosphere, fuel economy may be improved and emissions may be reduced. Furthermore, fuel vapor purging may be performed so that combustion of the fuel vapor provides engine torque that maintains engine efficiency. Accordingly, ECU 48 may control purge valve 222 and throttle valve 125 in cooperation to create suitable engine vacuum enabling fuel vapor to be purged from the fuel vapor canister and combusted in the cylinder(s) 30. In the example fuel system, fuel vapor may be purged from the fuel tank and canister to regulate fuel tank pressure without releasing fuel vapor to the atmosphere without substantial fuel efficiency drop off.

It should be appreciated that other fuel vapor venting and purging configurations may be implemented in the fuel system discussed above. For example, additional vent pipes and/or canisters may be used to filter and contain fuel vapor. As another example, a fuel vapor purging system may include multiple purge valves.

Figure 4:
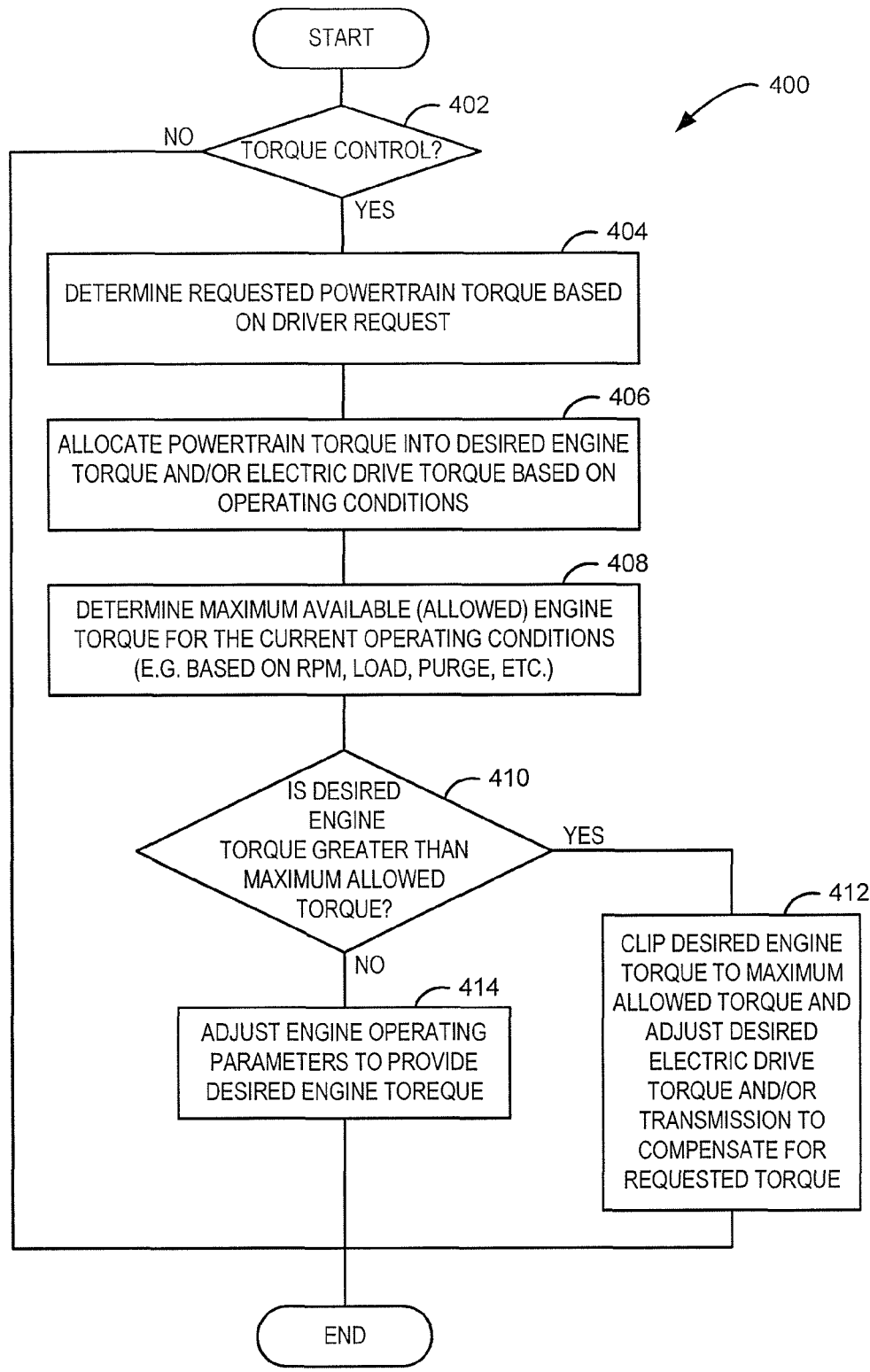
FIG. 4 shows a high level flowchart for allocating a requested drive torque among an engine and an electric motor, where the engine torque command is maintained within an allowable range.
Figure 5:
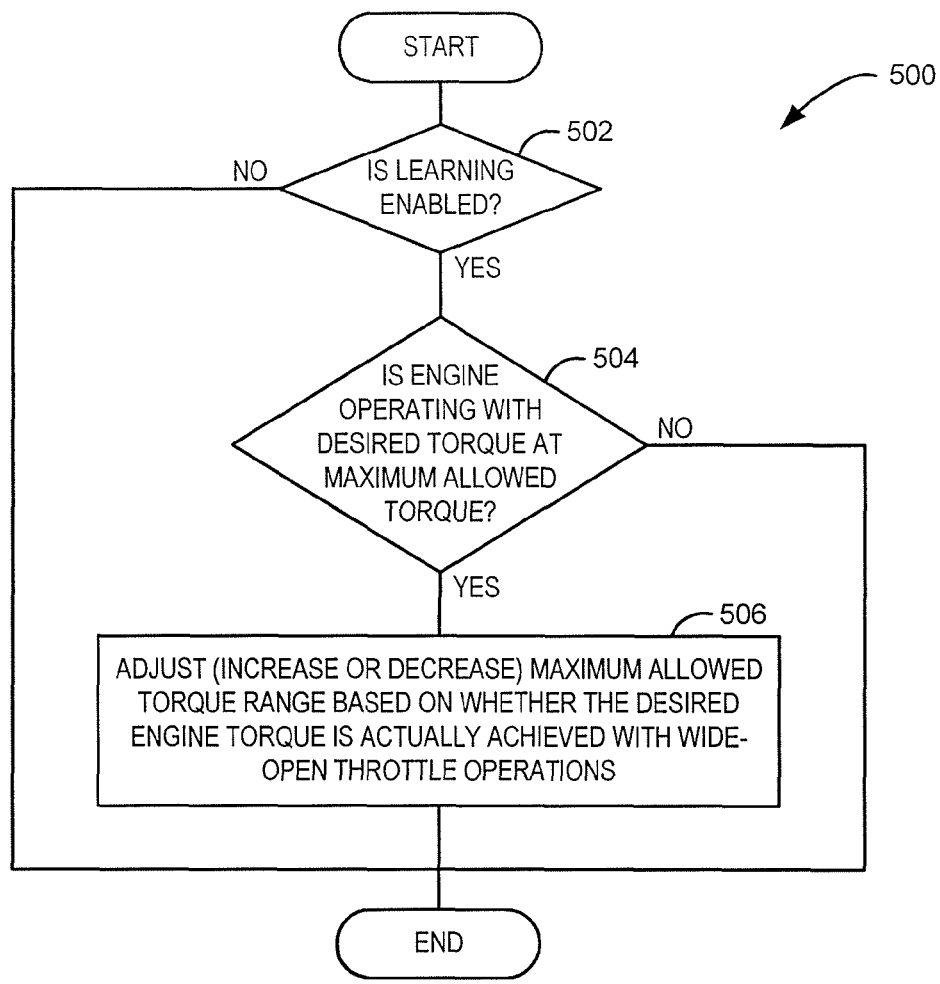
FIG. 5 shows a high level flowchart for managing adjustment of the allowable range of engine torque commands based on engine performance at wide-open throttle conditions.
Figure 6:
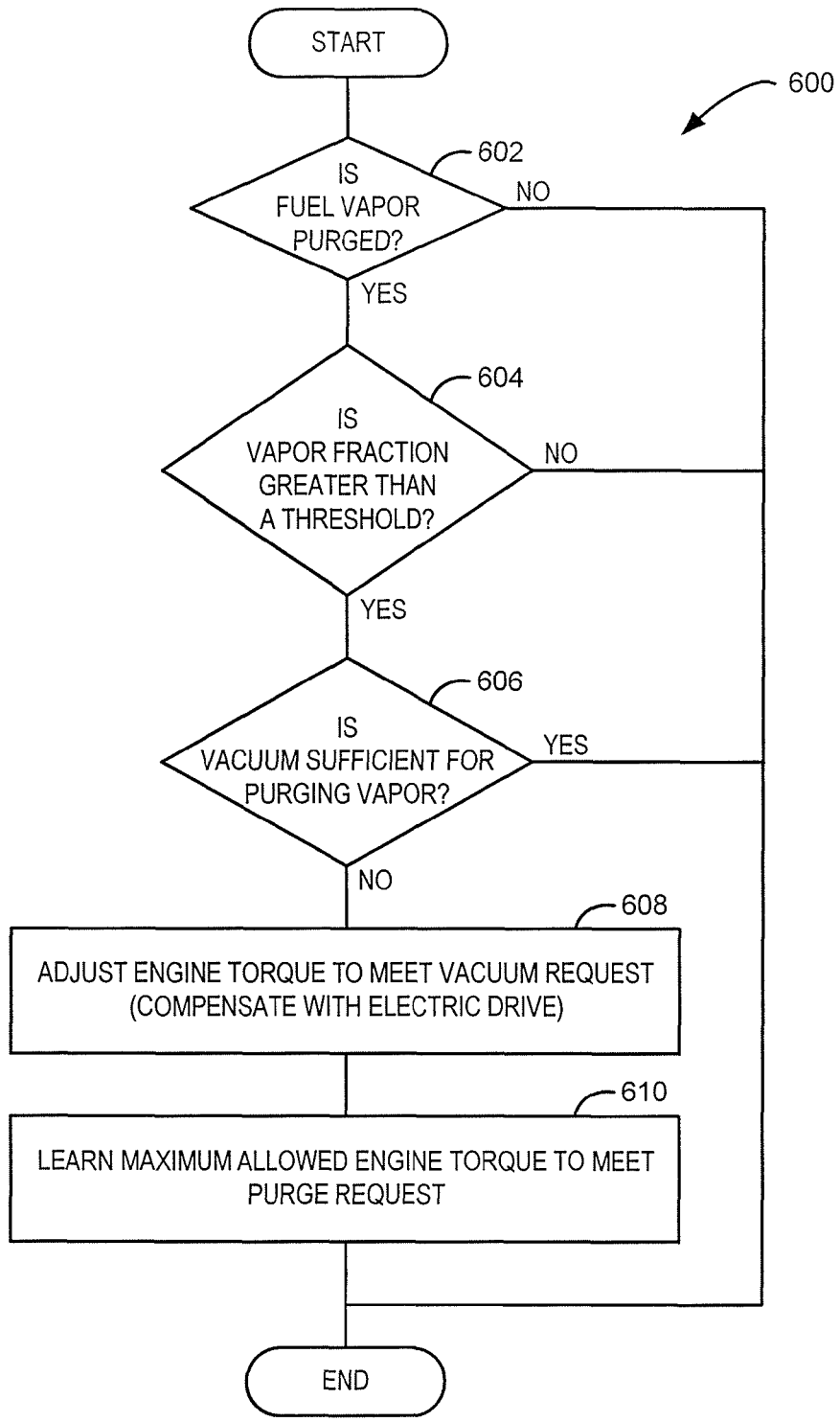
FIG. 6 shows a high level flowchart for managing adjustment of the allowable range of engine torque commands that can be requested during a fuel vapor purging operation.

FIGS. 4-6 show example flowcharts illustrating exemplary approaches for operation of a hybrid powertrain of a vehicle. FIG. 4 shows a high level flowchart for allocating a requested drive torque among an engine and/or an electric motor, wherein the engine torque command is maintained within an allowable range. First, in 402, a method 400 determines whether torque control is commanded. If the answer is yes, in 404, method 400 determines a requested powertrain torque based on a driver request. Then, in 406, method 400 allocates the requested powertrain torque into a desired engine torque and/or an electric drive torque based on operation conditions. The electric drive torque may be torque from a motor, such as traction motor 38 shown in FIG. 1.

Next, in 408, method 400 includes determining a maximum available engine torque or a maximum allowed engine torque for the current operating conditions. The maximum allowed engine torque may be determined or estimated based on the engine operating conditions such as engine speed, load, vapor purge conditions, etc. The maximum allowed torque may vary depending on operating conditions. However, as described in detail below, the maximum allowed torque may be accurately estimated through learning actual operating conditions.

Next, in 410, method 400 determines whether the desired engine torque is greater than the maximum allowed torque. If the answer is no, the engine is capable of providing the desired torque. Thus, in 414, method 400 adjusts engine operating parameters to provide the desired engine torque. If the answer is yes, in 412, method 400 includes clipping the desired engine torque to the maximum allowed torque and adjusting electric drive and/or transmission to compensate for the desired torque. Additionally or alternatively, method 400 may continue from 412 and/or 414 to 402, where the engine operating parameters may be adjusted further to provide the desired engine torque.

An engine may have a variable maximum torque output depending on operating conditions. However, the maximum allowed engine torque may be estimated and then adjusted under specific operating conditions. For example, FIG. 5 shows a high level flowchart for managing adjustment of the allowable range of engine torque commands based on engine performance at wide-open throttle conditions. First, in 502, a method 500 determines whether learning the maximum allowed engine torque is enabled or whether the operating condition for adaptively learning the maximum allowed engine torque is satisfied. In one example, the operating condition may a condition where the engine is not operating at wide-open throttle. In another example, the condition may be a condition where no fuel vapor purge is performed. If the answer is yes, at 504, method 500 further determines whether the engine is operating with a desired torque at the maximum allowed torque. If the answer is yes, at 506, method 500 adjusts (e.g., increase or decrease) a maximum allowed torque range for the current operating conditions based on whether the desired engine torque is actually achieved with the wide-open throttle operation.

In some embodiments, the adjustment of the maximum allowed torque may be based on an estimated maximum allowed torque which is determined based on the operating conditions. Accurate estimation of the maximum allowed torque may be difficult because various variables may affect the accuracy of the torque estimation. The variables include but are not limited to, acceleration time from zero to 60 miles/hour, power control, tip-out delays, engine temperature on steep grades, etc. For example, to minimize 0-60 acceleration time, the vacuum protection may be removed during full pedal compression.

Further, in some conditions, it may be difficult to estimate the effect of some variables on the maximum torque prediction. The variables include but are not limited to engine wear, air filter flow restriction, temperature, barometric pressure, humidity, intake passage restrictions, spark angle, and fuel type. Each of these variables may have a direct affect on the maximum torque that an engine can produce, i.e., the maximum allowed torque. The effects may be due to the change in maximum airflow capability into the engine.

The effect may be impossible to be precisely quantified for each individual variable or collectively quantified for more than one variable. However, the maximum allowed torque may be adjusted based on another operating condition, such as actual torque produced by the engine and actual vacuum in an intake manifold of the engine, until the estimated allowed torque is substantially close to the maximum allowed torque. For example, in some embodiments, the maximum allowed torque may be estimated by a controller based on a torque request. The controller, such as the VSC 46 or ECU 48, described above, may be configured to determine the estimated maximum allowed torque. The determination may be made based on a torque request from the vehicle, such as a driver's request. In some embodiments, the driver's request may be based on a pedal position as measured by position sensor 119 shown in FIG. 2. It should be appreciated that various torque requests of the vehicle may be used to estimate the maximum allowed torque of the engine by the controller.

One approach to determine the maximum allowed torque is to adjust the estimated maximum allowed torque using a torque adjustment value where the torque adjustment value is varied based on an operating condition. In some embodiments, the torque adjustment value may be a function of a rotational speed (N) of the engine. The torque adjustment value may be selected from a plurality of possible torque adjustment values corresponding to different engine speeds. In some embodiments, the torque adjustment value may be set within a range such as in the range of −20 to +20 Newton meters (Nm). The torque adjustment value may be stored as a matrix in a memory of the controller, such as VSC 46 or ECU 48. In some embodiments, the torque adjustment value may be stored in KAM 110 of the controller. The torque adjustment value may be available during restart of the engine and then may be adjusted or updated during a vehicle operation as described below. Alternatively, the torque adjustment value may be given an initial value that is set within the range described above and adjusted or updated during vehicle operation.

In one example, varying the torque adjustment value may be based on an actual torque produced by the engine. The actual torque may be a torque that the engine can produce in response to the controller's command. In some embodiments, the actual torque may be determined by a suitable measurement. For example, in a hybrid electric vehicle, the actual torque may be measured by a generator (e.g., generator 30 shown in FIG. 1) of the vehicle. In some embodiments, the actual torque may be determined based on actual engine operations such as an amount of airflow entering into the engine system either through a measurement or an estimation of the airflow in an intake manifold. In some embodiments, the actual torque may be determined by modeling based on engine operation parameters such as engine speed, fuel injection, spark timing, etc.

Varying the torque adjustment value may be further performed based on a determination of whether a request for the maximum torque is stable. Thus, the maximum torque may be adjusted or the torque adjustment value may be varied based on the actual torque produced by the engine. The following algorithm may be used to configure a timer, TQ_MAXREQ_TMR, to count for a time period when the maximum torque is requested:

```
IF (emp_tq_eng_des >= TQE_MAXALLOW - small_offset)
THEN TQ_MAXREQ_TMR = TQ_MAXREQ_TMR + delta_time
ELSE TQ_MAXREQ_TMR = 0.0
``` where emp_tq_eng_des is the requested torque or the maximum allowed torque estimated by the controller in response to the request, TQE_MAXALLOW is the maximum allowed torque of the engine, small_offset is a predetermined value, and delta_time is a time increment, such as 0.1 second. The request for the maximum torque is stable when the timer exceeds a threshold time. In one embodiment, the threshold time is 1.0 second although it may be adjusted to various values.

After determination that the request for the maximum torque is stable, the information on the actual torque produced by the engine or the feedback torque may be used to update the torque adjustment value. For example, in some embodiments, the torque adjustment value may be decreased if the actual torque is less than the estimated maximum allowed torque. Decreasing the torque adjustment value over successive cycles has the effect of "learning down" the estimated maximum allowed torque.

In some embodiments, decreasing the torque adjustment value may be further performed based on a determination that the actual torque is less than the estimated maximum allowed torque and that a difference in the estimated maximum allowed torque and the actual torque exceeds a predetermined amount. In one embodiment, the predetermined amount is 3.0 Nm although various values may be used. Thus, the following algorithm may be used to determine the torque adjustment value:

```
IF (tq_maxreq_tmr >= 1 second)
AND (tqe_tq_fbk <= emp_tq_eng_des - 3 Nm)
THEN
tqe_max_kam[N] = tqe_max_kam[N] - tqmax_dec
``` where tqe_tq_fbk is the feed back torque or the actual torque produced by the engine, tqe_max_kam[N] is the torque adjustment value, and tqmax_dec is a torque adjustment value increment. Typically, tqmax_dec is a positive value. In some embodiments, tqmax_dec may be a predetermined value of 0.1 Nm or less although other values may be used.

Likewise, maximum allowed torque may be learned higher when the actual torque produced by the engine is higher than the estimated maximum allowed torque, i.e., "learning up." The torque adjustment value is increased if the actual torque is greater than the estimated maximum allowed torque. In some embodiments, increasing the torque adjustment value may be performed based on a determination that the requested maximum torque is capable of being produced. For example, the requested maximum torque is capable of being produced if a difference in the estimated maximum allowed torque and actual torque is less than a predetermined amount. In one embodiment, the predetermined amount is 1.0 Nm although other values may be used. Thus, the following algorithm may be used to determine to increase the torque adjustment value:

```
IF (tq_maxreq_tmr >= 1 second)
AND (tqe_tq_fbk >= emp_tq_eng_des - 1 Nm)
THEN
tqe_max_kam[N] = tqe_max_kam[N] + tqmax_inc
``` where tqmax_inc is a torque adjustment value increment. In some embodiments, tqmax_inc may be a predetermined value of 0.1 Nm or less although other values may be used.

It should be noted that the torque adjustment value may remain unchanged if it is determined that the actual torque produced by the engine is substantially close to the estimated maximum allowed torque. In some embodiments, such a determination may be made based on the algorithm as described above when the condition to learn lower or higher maximum allowed torque is not met.

When the torque adjustment value is determined through learning, the maximum allowed torque may be adjusted by adding the torque adjustment value to the estimated maximum allowed torque as below:

$$TQE\_MAXALLOW = tqe\_maxallow\_tmp + tqe\_max\_kam[N]$$

where TQE_MAXALLOW is an adjusted maximum allowed torque and tqe_maxallow_tmp is a current maximum allowed torque. The current maximum allowed torque may be the estimated maximum allowed torque by the controller.

The adjustment of the maximum allowed engine torque may be performed based on whether a desired engine torque can be achieved with wide-open throttle operation. In some embodiments, learning the torque adjustment value or adjusting the maximum allowed torque may be suspended when the engine is operating near wide-open pedal conditions. Alternatively, a separate set of torque adjustment values may be learned while the engine is operating at wide-open throttle operation.

FIG. 6 shows a high level flowchart for managing adjustment of the allowable range of engine torque commands that can be requested during a fuel vapor purging operation. First, in 602, method 600 determines whether fuel vapor purging is being performed. If the answer is yes, method 600 goes to 604 to determine whether vapor amount is greater than a threshold. If the answer is yes, in 606 method 600 further determines whether vacuum is sufficient for purging fuel vapor. If the answer is no, in 608, method 600 adjusts an engine torque to meet the required vacuum. Under this condition, the requested torque may be compensated with an electric drive such as a motor.

Next, in 610, method 600 includes learning a maximum allowed engine torque to meet the purge requirements. Learning the maximum allowed engine torque may be based on an actual vacuum in the intake manifold of the engine. In some embodiments, the controller may operate the engine at near zero vacuum to achieve optimal fuel efficiency. In the hybrid electric vehicle, the engine may be operated with the opening amount of the throttle valve in the vicinity of the maximum opening amount (wide-open throttle) to improve the fuel efficiency of the engine. However, such operation may create a problem for a fuel system (e.g., fuel system 200 in FIG. 3) that requires vacuum. For example, as described above, fuel vapor canister 220 may require vacuum to purge fuel vapor into the intake manifold of the engine. The problem may be solved by adjusting the maximum allowed torque to achieve the required purge vacuum. Lowering the engine torque may provide the required purge vacuum. Thus, adjusting the maximum allowed torque may include decreasing the estimated maximum allowed torque by subtracting the torque adjustment value from the estimated maximum allowed torque.

In some embodiments, the adjustment of the estimated maximum allowed torque may be performed only when the vacuum is required so that normal operation (e.g., near wide-open throttle) is not interrupted. A threshold vacuum required for fuel vapor purge may be established and the adjustment of the estimated maximum allowed torque may be performed when the threshold vacuum has been met. In some embodiments, the threshold vacuum may be in a range of 0.0 to 0.1 inches of mercury. An example algorithm shown below may be used to determine the enabling of the vapor purge and the required purge vacuum, PG_VAC_REQ:

```
IF (PG_FUL_FRAC > threshold) AND (PCOMP_ENA = 1)
THEN PG_VAC_REQ = 2 In Hg
ELSE PG_VAC_REQ = 0
``` where PG_FUL_FRAC is the purge fuel fraction being inducted and PCOMP_ENA indicates whether purge fuel compensation adjustment of the fuel injector is enabled. In some embodiments, the requirement for purge to be enabled may be removed to avoid a noticeable change in torque during the transitions in and out of purge. It should be noted that any condition for enablement may be removed to initiate purge. While PG_VAC_REC is set to be 2.0 inches of mercury in the above algorithm, it should be noted that various values may be used, and the value may be adjusted with operating conditions, engine type, etc. For example, the required purge vacuum may be a function of PG_FUL_FRAC and rotational speed (N) of the engine and thus may be selected from a plurality of possible PG_VAC_REQ values corresponding to PG_FUL_FRAC and N.

Adjusting the maximum allowed torque may be accomplished by subtracting the torque adjustment value from the estimated maximum allowed torque. The torque adjustment value typically has a positive value. Thus, if actual vacuum is less than the required purge vacuum, the torque adjustment value, tqe_vac_kam may be increased. In this way, the maximum allowed torque is further decreased so that the required purge vacuum is provided or protected. The following algorithm may be used to adjust the torque adjustment value:

```
IF (BP − MAP_raw) < (PG_VAC_REQ)
THEN
tqe_vac_kam = tqe_vac_kam + tqvac_inc
``` where BP is the atmosphere pressure or barometric pressure, MAP_raw is the actual manifold absolute pressure (MAP), and tqvac_inc is a torque adjustment increment which may be a value such as 0.1 Nm or 0.2 Nm. The pressure difference (BP−MAP_raw) between a barometric pressure and MAP is the actual vacuum in the intake manifold. The barometric pressure may be measured by a barometer. The MAP may be measured by a MAP sensor (e.g., pressure sensor 122 shown in FIG. 2) or may be inferred from the engine operating parameters.

The maximum allowed torque may be adjusted to be decreased less when the required purge vacuum is less. In some embodiments, the torque adjustment value may be decreased incrementally if the actual vacuum is greater than the required purge vacuum. Further, decreasing the torque adjustment value may be performed after a determination that the maximum torque request is stable, the engine is capable of producing the request torque, and the actual vacuum is too high. For example, the request for the maximum torque may be determined to be stable if the requested time exceeds a threshold time. In one embodiment, the threshold time is 1.0 second. The vacuum in the intake manifold is too high if a difference in the actual vacuum and the required purge vacuum exceeds a predetermined value. Thus, the following algorithm may be used to decrease the torque adjustment value:

```
IF (TQ_MAXREQ_TMR >= 1 second)
AND (BP − MAP_RAW) > (PG_VAC_REQ + hysteresis)
AND (TQE_TQ_FBK >= emp_tq_eng_des − 1 Nm
THEN
tqe_vac_kam = tqe_vac_kam − tqvac_dec
``` where TQ_MAXREQ_TMR is a timer to count for a time period when the maximum torque is requested, tqe_tq_fbk is a feedback torque or the actual torque produced by the engine, emp_tq_eng_des is the maximum allowed torque estimated by the controller in response to the torque request, hysteresis is a predetermined value, and tqvac_dec is a torque adjustment value increment. In some embodiments, tqvac_dec may be 0.1 or 0.2 inches of mercury and the hysteresis is 0.2 or 0.4 inches of mercury, for example.

When the torque adjustment value is determined through the learning, the maximum allowed torque may be adjusted by subtracting the torque adjustment value to the current maximum allowed torque or the estimated maximum allowed torque as below:

$$TQE\_MAXALLOW = tqe\_maxallow\_tmp - tqe\_vac\_kam.$$

It should be appreciated that methods 500 and 600 are merely exemplary approaches to learn the maximum allowed torque. However, other suitable mechanisms to learn the maximum allowed torque based on an engine operating condition may be used. For example, a proportional/integral (PI) or a proportional/integral/derivative (PID) controller may be used to adjust the maximum allowed torque based on feedback torque.

Figure 7A:
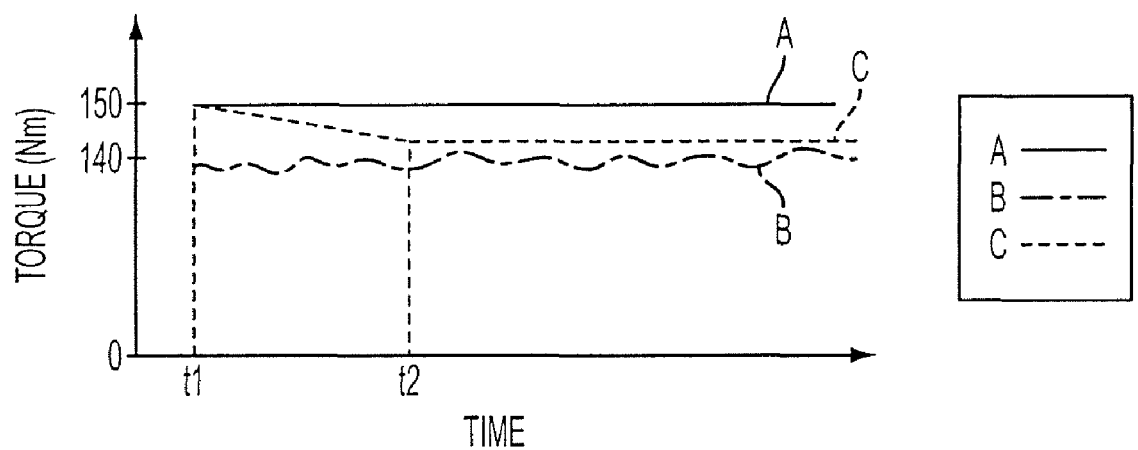
FIGS. 7A-7B show a change in engine torque and torque adjustment value over time, graphically illustrating an implementation of the method shown in FIG. 4.
Figure 7B:
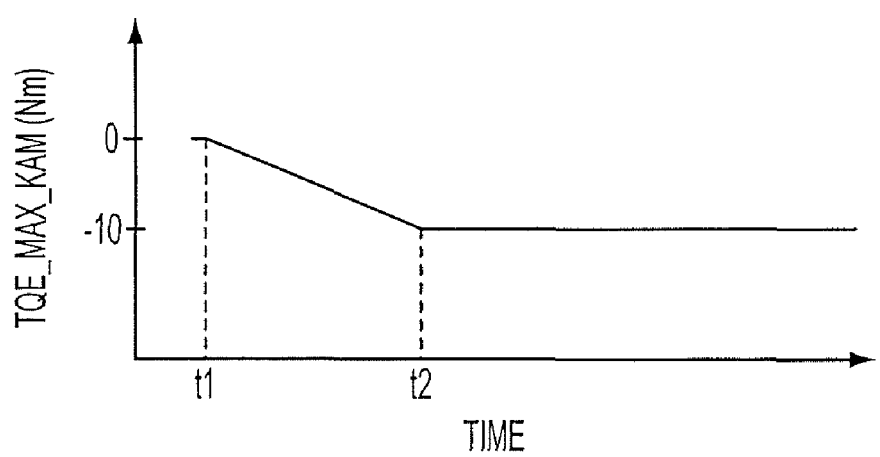

FIGS. 7A-7B show the change of the engine torque and the torque adjustment value over time, schematically illustrating an implementation of method 500. As illustrated in FIG. 7A, curve A indicates an estimated maximum allowed torque of the engine and shows that the estimated maximum allowed torque remains unchanged over the time, i.e., the torque request for the engine is constant. Curve B indicates an actual engine torque produced by the engine and shows that the actual torque is less than the estimated maximum allowed torque.

FIG. 7B illustrates the adjustment of a torque adjustment value based on the estimated maximum allowed torque and the actual torque produced by the engine as shown in FIG. 7A. As shown in FIG. 7B, the torque adjustment value may be adjusted starting at time $t_1$ when the actual torque is less than the estimated maximum allowed torque. The torque adjustment value is negative and decreases incrementally until time $t_2$.

In response to the variation of the torque adjustment value, the maximum allowed torque is adjusted using method 500. Curve C in FIG. 7A shows the adjusted maximum allowed torque is decreased until time $t_2$ where the adjusted maximum allowed torque is substantially close to the estimated maximum allowed torque. In the depicted example, the maximum allowed torque is adjusted until it is slightly higher than the actual torque. FIGS. 7A and 7B illustrate the situation where the maximum allowed torque is "learned down" when the actual torque is lower than the estimated maximum allowed torque. Similarly, the estimated maximum allowed torque may be incrementally adjusted up based on a determination that the actual torque is higher than the maximum allowed torque, i.e., "learning up." In such a situation, the torque adjustment value may be a positive value and may increase incrementally when conditions to "learn up" as described with reference to FIG. 5 are met.

As described above, method 500 allows the maximum allowed torque to be learned dynamically based on the actual torque produced by the engine. Since the maximum allowed torque can be estimated accurately, the fuel efficiency can be improved by operating the engine at a torque near the requested torque. In a hybrid electrical vehicle, the accurate estimation of the maximum allowed torque permits the vehicle system controller to accurately allocate torque requirements between the engine and the battery. In this manner, the energy from both the engine and the battery can be efficiently utilized.

Figure 8A:
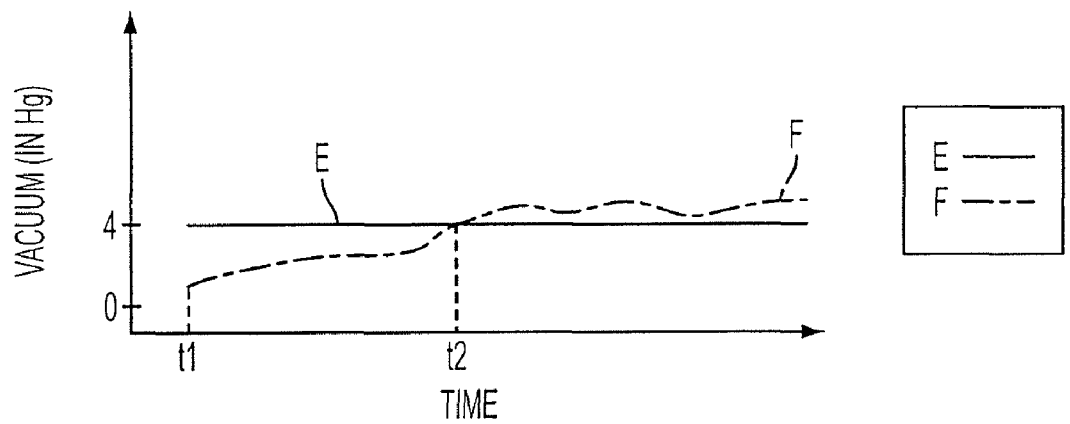
FIGS. 8A-8C show a change in vacuum, torque adjustment value, and engine torque over time, respectively, graphically illustrating an implementation of the method shown in FIG. 4.
Figure 8B:
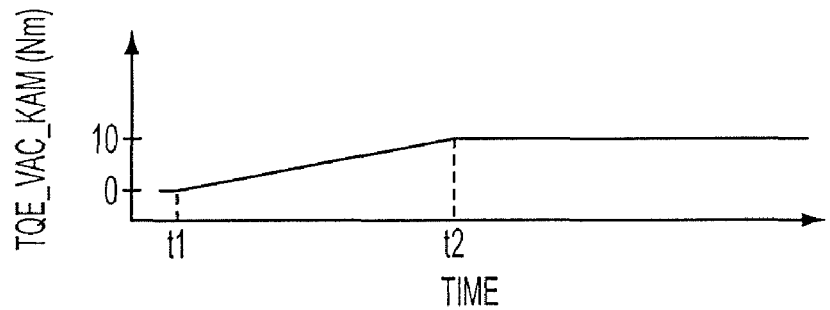
Figure 8C:
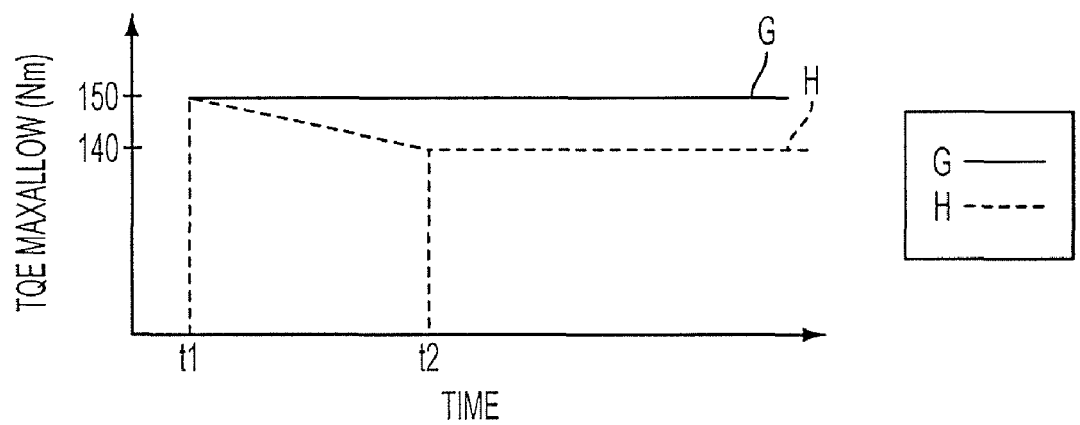

FIGS. 8A-8C show the change of the vacuum, the torque adjustment value, and the engine torque over time respectively, schematically illustrating an implementation of method 600. Curve E shows a required purge vacuum and Curve F shows an actual vacuum in an intake manifold of an engine. As shown in FIG. 8A, the actual vacuum is less than the required vacuum from time $t_1$ to time $t_2$, which indicates that more vacuum is required for the fuel vapor purge. The torque adjustment value (tqe_vac_kam) may be adjusted by the controller using method 600 according to information on the actual vacuum and the required vacuum.

The variation of the torque adjustment value corresponding to the change of vacuum is illustrated in FIG. 8B. As shown in FIG. 8B, the torque adjustment value increases incrementally in response to the actual vacuum from $t_1$ to $t_2$.

The adjustment of the maximum allowed torque is illustrated in FIG. 8C. Curve G shows the estimated maximum torque and Curve H shows an adjusted maximum torque. From $t_1$ to $t_2$, the maximum allowed torque is adjusted by subtracting the torque adjustment value from the estimated maximum allowed torque. Consequently, the maximum allowed torque is decreased.

The engine controller operates the engine based on the adjusted maximum allowed torque. From time $t_2$, the actual vacuum is controlled to be substantially close to the required purge vacuum as shown in FIG. 8A. Since the condition to vary the torque adjustment value is not met, the torque adjustment value does not change after time $t_2$, as shown in FIG. 8B. As a result, the adjusted maximum allowed torque remains unchanged after time $t_2$, as shown by Curve H in FIG. 8C.

As described above, the implementation of method 600 may provide the vacuum required for fuel vapor purge. In this way, the required purge vacuum may be achieved by controlling the maximum allowed torque for the engine. Thus, other approaches such as clipping the throttle at all times in order to achieve the required purge vacuum may not be necessary.

It may be appreciated that the order of processing detailed herein is not necessarily required to achieve the features and advantages of the example embodiments described herein, but is provided for ease of illustration and description. One or more of the illustrated steps, acts and/or functions may be repeatedly performed depending on the particular strategy being used. Further, the described actions may graphically represent code to be programmed into a computer readable storage medium, for example, in the engine control system and/or vehicle controller.

Furthermore, it will be appreciated that the various embodiments and methods of operation disclosed herein are exemplary in nature, and these specific embodiments are not to be considered in a limiting sense, because numerous variations are possible. The subject matter of the present disclosure includes all novel and non-obvious combinations and subcombinations of the various features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the various features, functions, elements, and/or properties disclosed herein may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for operating a powertrain in a vehicle, the powertrain including an electric drive and an internal combustion engine, the method comprising:
   providing torque to drive the vehicle from both the electric drive and the engine, where engine torque is varied within an allowable range;
   when operating the engine at an edge of the allowable range, adjusting the allowable range based on whether a selected operating condition can be provided by the engine;
   limiting an engine torque commanded by a vehicle system controller to an engine controller to be within the adjusted allowable range and compensating limitation of the engine torque by increasing torque from the electric drive to meet a driver request;
   suspending the adjusting of the range if operating near wide-open throttle conditions, where the selected operating condition is engine torque; and
   suspending the adjusting of the allowable range based on engine torque if purging more than a selected amount or concentration of fuel vapors into the internal combustion engine from a fuel system, and adjusting the allowable range based on whether a vacuum amount is provided.

2. The method of claim 1, wherein the range is adjusted based on whether a desired engine torque is achieved with wide-open throttle operation.

3. The method of claim 1, wherein the selected concentration of fuel vapors is a predetermined fuel vapor concentration determined based on fuel injector adjustment during purging operation.

4. The method of claim 3, wherein the range is adjusted based on whether a desired engine torque is achieved with wide-open throttle operation.

5. The method of claim 1, wherein adjusting of the range is suspended when operating away from an end of the range.

6. The method of claim 5, further comprising adaptively learning the adjustment in keep alive memory of a controller.

7. A system for a hybrid vehicle having a powertrain including an electric drive and an internal combustion engine, comprising:

a vehicle system controller, the vehicle system controller adjusting drive allocation between the electric drive and the internal combustion engine based on operating conditions, wherein the vehicle system controller generates an engine drive command and transmits the engine drive command to an engine controller, the engine drive command varied within an allowable range; and the engine controller receiving the engine drive command, which is an engine torque, from the vehicle system controller and adjusting engine output responsive to the engine drive command, wherein when operating the engine at an edge of the range, the range is adjusted based on whether a selected operating condition can be provided by the engine so that as a maximum engine torque of the engine is reduced, the vehicle system controller reduces the allowable range and adjusts the electric drive, which is a motor coupled to wheels of the vehicle, to compensate for the reduction in the allowable range of the engine, wherein adjusting the range is suspended if purging more than a selected amount or concentration of fuel vapors into the engine from a fuel system, where the range is adjusted based on whether a vacuum amount is provided.

8. The system of claim 7, wherein the maximum engine torque is reduced due to restricted airflow into the engine.

9. The system of claim 7, wherein adjusting of the range is suspended if operating near wide-open pedal conditions.

10. The system of claim 7, wherein the range is adjusted based on whether a desired engine torque is achieved with wide-open throttle operation.

11. A method to operate an internal combustion engine in a vehicle, the vehicle including a vehicle system controller configured to determine an estimated maximum allowed torque, and to control the internal combustion engine, the method comprising:

receiving the estimated maximum allowed torque from the vehicle system controller;

determining a torque adjustment value;

varying the torque adjustment value based on the estimated maximum allowed torque and an actual torque produced by the engine, wherein varying the torque adjustment value includes decreasing the torque adjustment value by a predetermined increment if the actual torque is less than the estimated maximum allowed torque and increasing the torque adjustment value by a predetermined increment if the actual torque is greater than the estimated maximum allowed torque;

controlling the internal combustion engine based on an adjusted maximum allowed torque, wherein adjusting the estimated maximum allowed torque includes adding the torque adjustment value to the estimated maximum allowed torque; and adjusting the estimated maximum allowed torque according to the torque adjustment value.

* * * * *